United States Patent
Chiu et al.

(10) Patent No.: US 6,233,283 B1
(45) Date of Patent: May 15, 2001

(54) LAYERED VIDEO CODING USING PERCEPTUAL CODING CRITERIA FOR ERROR RESILIENCE IN PACKET NETWORKS

(75) Inventors: Yi-Jen Chiu, Holmdel; John Hartung, Warren; James Steven Pawlyk, Maplewood, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/102,811

(22) Filed: Jun. 23, 1998

(51) Int. Cl.[7] .................................................. H04N 7/50
(52) U.S. Cl. .............................. 375/240.27; 375/240.14
(58) Field of Search .................... 375/240.27, 240.12; H04N 7/50

(56) References Cited

U.S. PATENT DOCUMENTS

| | | | |
|---|---|---|---|
| 5,455,629 | * 10/1995 | Sun et al. | 375/240.27 |
| 5,988,863 | * 11/1999 | Demos | 708/203 |
| 6,108,379 | * 8/2000 | Shikakura et al. | 375/240.27 |

* cited by examiner

*Primary Examiner*—Howard Britton

(57) ABSTRACT

An encoder for coding multiple layers of video signal to provide for efficient use of bandwidth. The encoder produces an error signal based at least in part on criteria considered by a perceptual preprocessor which takes into account limitations inherent in human visual perception. If the error signal generated from a subject frame represents high priority data that would be visually perceptible by a viewer, as determined by the preprocessor, the error signal is coded onto a base layer and an error resilience layer of a coded signal for transmission. In the event that the error signal is determined to be of less priority, such as if it represents only slightly visually perceptible information, then the error signal is coded onto only a low priority layer of the coded signal.

9 Claims, 1 Drawing Sheet

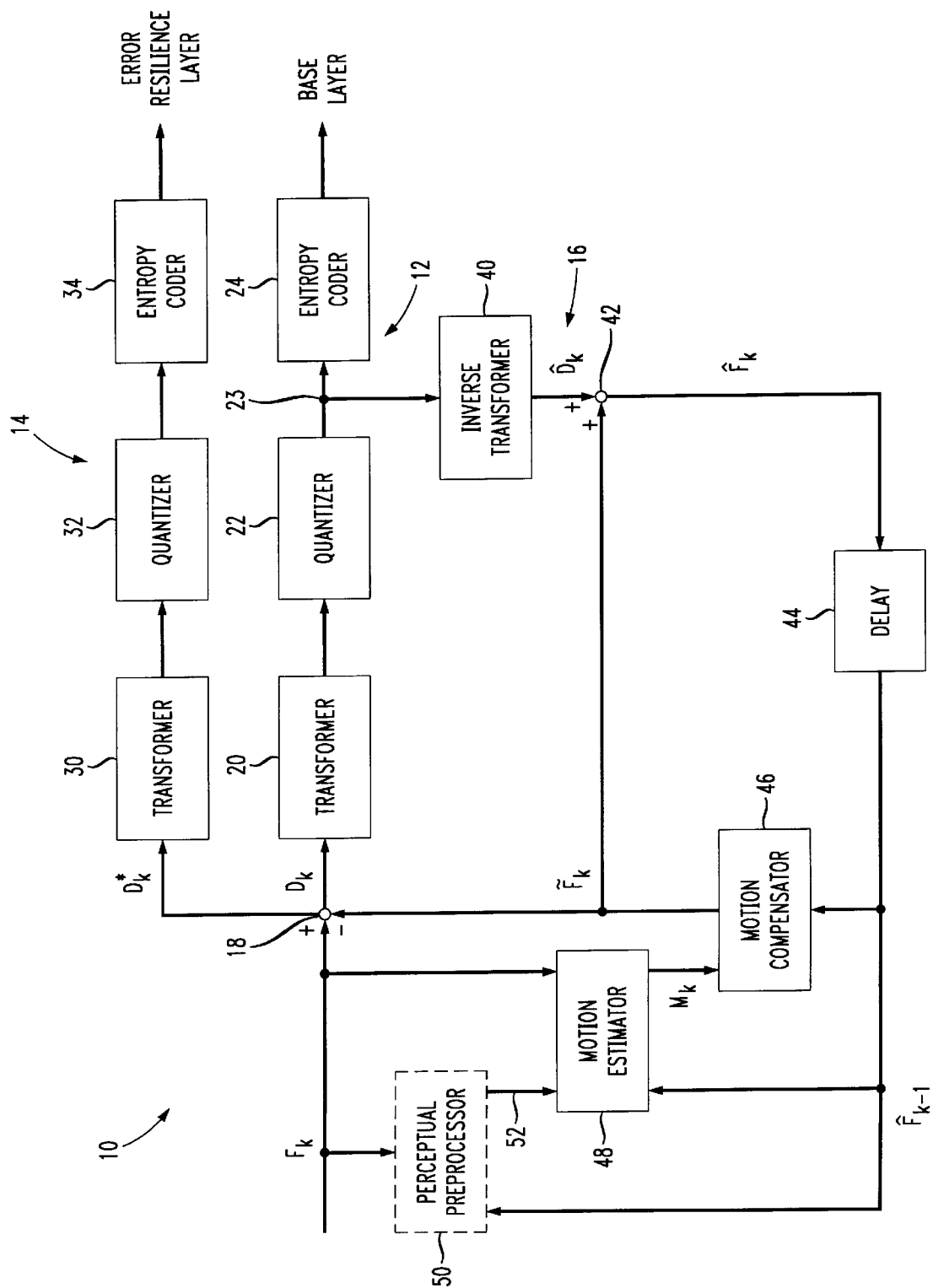

LAYERED VIDEO CODING USING PERCEPTUAL CODING CRITERIA FOR ERROR RESILIENCE IN PACKET NETWORKS

BACKGROUND OF THE INVENTION

I. Field of the Invention

The present invention relates to a video encoder for coding of a video signal prior to transmission through a medium. More particularly, the present invention pertains to a technique for encoding a signal using a perceptual preprocessor for considering human vision perceptual limitations.

II. Description of the Related Art

Video information in the form of a data bit stream is typically transmitted over a medium, e.g. the internet, in a packetized stream. Such video information is obtained from a video camera which generates a video signal containing a series of successive-in-time video frames depicting video images. Each frame consists of a number of picture elements or pixels which are divided into groups to form blocks. The video signal is processed, frame-by-frame, and encoded when necessary, such as when an error signal is detected between two adjacent-in-time frames, i.e. between a present frame and a prior frame. In this manner, only data affecting a change in object motion or pixel intensity need be transmitted, thus yielding an efficient use of available transmitter communication bandwidth.

For example, in a typical video signal encoder scheme each frame is divided into macro blocks of 16×16 pixels and an error signal representing the difference between pixel intensity of a current macro block and a corresponding prior macro block is obtained. The error signal is then converted from the spatial domain to the frequency domain by a transform function, such as a discrete cosine transform device. The digitized error signal is then quantized and entropy coded for transmission to a receiver. A feedback loop is provided which uses the quantized error signal to compensate for and estimate motion of objects in a current frame by comparing the position of the objects to a position from the prior frame.

Video data transmitted in packets is usually protected by a parity check scheme as known by those having ordinary skill in the art. Thus, the majority of internet video errors results from the loss of an entire packet during, for example, network congestion and buffer overflow. Such packet loss causes single or multiple macro block losses in the decoding process which results in severe degradation in perceived quality and error propagation. To combat video signal degradation and error propagation resulting from packet loss, layered video signals are used, wherein the video signal is divided into a base layer and an enhancement layer. The enhancement layer typically provides refinement information that is added to the base layer to provide higher quality, and which is transmitted with lower priority than the base layer. A known alternative approach is to use the second or enhancement layer to transmit a redundant version of the base layer when high losses are detected. Thus, the base layer will be transmitted on two distinct data streams with the hope that at least one of the streams will be correctly received.

The drawbacks of such prior art schemes is that they fail to adequately take into account the limitations of human visual perception when viewing a video signal. For example, not all lost video information, in the form of lost data packets, is visually perceptible by a viewer. Thus, the redundant transmission of such information is an inefficient use of bandwidth, as such information is not necessary and will not result in an appreciable difference to a viewer of the video information that is contained in the redundantly transmitted data packets.

SUMMARY OF THE INVENTION

The present invention is directed to a layered video encoder which considers human video perception limitations in determining whether to re-transmit lost video packet information. The inventive encoder is a block based coder that processes a single macro block portion of a frame of a video signal at any given time by comparing intensity values of picture elements contained in a subject macro block of a current frame to intensity values of corresponding picture elements contained in the subject macro block of a prior frame adjacent-in-time to the current frame. In the event that a transmission error is detected, such as when the subject macro block is not received successfully by a receiver, it may be necessary for the subject macro block to be re-transmitted. A perceptual preprocessor is used to determine, according to a set of criteria, whether to re-transmit the subject macro block and to what priority the re-transmitted macro block should be assigned. The criteria used to determine if and how retransmission of a subject macro block should occur are based, at least in part, on limitations in human visual perception. If the information contained in the subject macro block is of the type which is highly perceivable by a human viewer, the subject macro block will be re-transmitted at a high priority by encoding the subject macro block onto a base layer and an error resilience layer of data. If the information is at a lower priority wherein the information contained in the subject macro block would be only slightly, if at all, perceived by a human viewer, then the subject macro block will be re-transmitted at a lower priority by encoding the subject macro block onto the enhancement layer, or by simply not re-transmitting the data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

The FIGURE depicts a block diagram of an inventive block based video encoder in accordance with the present invention.

DETAILED DESCRIPTION OF THE PRESENTLY PREFERRED EMBODIMENTS

A block diagram of the inventive video encoder is depicted in the figure and identified by the general reference numeral 10. Encoder 10 includes an input port 5 which receives a block of video information from a video signal. For example, a source such as a video camera (not shown) or the like generates a video signal in the form of a plurality of successive-in-time frames, with each frame being represented by a fixed number of picture elements (pixels) having intensity values for reproducing images of objects contained on a subject frame when the video signal is received by a video receiver. Each frame is divided into blocks of pixels by a block splitter (not shown), as is known in the art, such as by dividing each frame into macro blocks sized at 16×16 pixels. For each frame, each macro block is provided, one at a time, to input port 5 for encoding.

As is known in the art, in order to achieve efficient use of bandwidth, among other reasons, each frame of video information is not individually encoded and then transmitted for reproduction at a down stream video display, such as a CRT. Rather, only the differences in the form of pixel intensity and object motion, represented as "F" and "M", respectively, in the figure between a current frame and a presently displayed (e.g. prior-in-time) frame on a display are encoded and transmitted so that the presently displayed frame need only be altered by such differences to thereby display the current frame information on the display. Such differences are usually referred to as error signals or difference signals and are represented in the figure as "$D_k$", wherein k refers to the frame designation.

The intensity values of a current frame $F_k$ are provided to input port 5 and received by a subtractor 18 which produces an error signal $D_k$, and to a motion estimator 48 for estimating motion of an object in the current frame by comparing it to a prior frame adjacent-in-time to the current frame. The current frame is also provided to a perceptual preprocessor 50 for determining, as explained more fully below, whether differences between a current frame which is subject to transmission errors and a prior frame are such as are noticeable to a viewer's visual perception. Depending on certain criteria, the current frame that experienced transmission errors may be encoded and re-transmitted to a receiver.

Encoder 10 is a layered encoder which, in the preferred embodiment, generates two layers of coded data, namely, a base layer and an enhancement or error resilience layer. The base layer contains necessary information for the video signal and is, therefore, transmitted at a high priority. The enhancement layer contains video enhancing information which is transmitted at a lower priority than the base layer. Encoder 10 includes a first encoder branch 12 for encoding an error signal of a current frame $D_k$ onto the base layer. The first encoder branch 12 includes a transformer 20, such as a discrete cosine transform (DCT) device for converting the error signal $D_k$ from the spatial domain to the frequency domain whereupon the converted signal is quantized by a quantizer 22. In the preferred embodiment, quantizer 22 has an adjustable step size to vary the quantization of the transformed error signal between a coarse step and a fine step. The quantized signal is then provided to a node 23 and to an entropy coder 24 which operates, as is known by those having ordinary skill in the art, to code the quantized signal. The resulting coded signal is finally provided to a buffer (not shown) and transmitted to a receiver (not shown).

Encoder 10 also includes a second encoder branch 14 for coding an error signal D* for the enhancement or error resilience layer. Like first encoder branch 12, branch 14 includes a DCT transformer 30, a quantizer 32 and an entropy coder 34, all of which function in a similar manner to like devices in the first branch 12. The coded error resilience layer is also provided to a buffer (not shown) and is transmitted at a lower priority than that of the base layer.

A feedback loop 16 connected between node 23 and subtractor 18 is arranged for obtaining information on prior-in-time frames and is used for, inter alia, estimating the motion of an object as it moves across a display field from one frame to the next. Feedback loop 16 contains an inverse transform device 40, such as an IDCT, which re-converts the quantized error signal $D_k$ from the frequency domain to the spatial domain, shown as $\hat{D}_k$. Feedback loop 16 includes a frame store or delay unit 44, a motion compensator 46 and a motion estimator 48, which are used for producing an estimate of the current block, shown as signal $\tilde{F}_k$, that is provided to subtractor 18 for producing the error signal D. The estimate of the current block consists of a prediction of the image of the current block derived from the motion compensator 46—which derives the prediction or estimate from the image of a previous block—as well as a displacement measurement of the image. The displacement measurement is typically in the form of a motion vector generated by the motion estimator 48 which measures a displacement between images by comparing the current block to a corresponding previous block that was stored in delay 44. In the event that there is no movement of an object from a prior frame to a current frame, there is no motion to be estimated, in which case the motion estimator will function as a simple conditional replenishment coder.

The inventive encoder 10 includes a perceptual preprocessor 50 which considers and takes into account limitations inherent in the visual perception of a human in determining whether a lost or corrupted frame should be re-transmitted. For example, if a change in intensity and motion of a current frame to a prior frame is only slight such that the change would not be easily detectable by a viewer, it will be unnecessary to re-code and retransmit such a frame in the event that the frame is lost or corrupted as a result of an error such as a buffer overflow, etc. Depending on the change in luminance and motion, the corrupted or missing frame ("subject frame") may require high priority because the information contained therein is necessary for continuity of a video signal. As such, an error signal D from such frame would be directed to both the first encoder branch 12 and second encoder branch 14 for encoding onto the priority base layer and the error resilience layer to ensure that the missing frame is received by a receiver. In other words, by encoding the missing information twice (once on a base layer and once on an error resilience layer), there is a greater likelihood that the missing information will be received by a receiver.

For less valuable information contained on a subject frame, the error signal can be directed to one or the other of the first and second coder branches 12, 14, respectively, depending on the priority accorded the information. Finally, if the corrupt or missing frame does not contain information which passes a predetermined minimum threshold criteria of human visual perception, the information need not be re-transmitted, as such information would not be visually perceptible by a viewer to an extent sufficient to warrant retransmission. The operation of the perceptual preprocessor will be explained in further detail below.

Perceptual preprocessor 50 receives as an input signal the pixel intensity values $F_k$ of a current frame and the pixel intensity values of a prior reconstructed frame $\hat{F}_{k-1}$ from a prior frame adjacent-in-time to the current frame. The reconstructed frame $\hat{F}_{k-1}$ is obtained from a delayed version of the addition of the inverse transform of error signal $\hat{D}_k$ and the pixel intensity of the current frame after motion compensation $\tilde{F}_k$ which is added by adder 42. The perceptual preprocessor 50 outputs an output signal 52 that serves as one of three inputs to the motion estimator 48, the other inputs being $F_k$ and $\hat{F}_{k-1}$, and the motion estimator outputs a motion vector $M_k$. The motion vector is, in turn, input to motion compensator 46, which also receives the pixel intensity of the prior reconstructed frame $\hat{F}_{k-1}$ as an input and generates the pixel intensity signal of the frame after motion compensation $\tilde{F}_k$. This signal is provided to the subtractor 18 and subtracted from the intensity values of the current frame $F_k$ to generate the error signals $D_k$ and $D_k^*$.

As explained above, the inventive encoder takes into account the limitations inherent in human visual perception to determine, in the event that a signal received from a transmitter indicates that a transmitted video frame was not received or was received with corrupted data, whether and at what priority a reconstructed version of the current frame should be transmitted. This is accomplished by estimating the visibility of changes which have occurred in each macroblock from the previously reconstructed frame using a model of the human visual system response to these changes. For each pixel in the current frame this model is a function of the current pixel value and the values of a neighborhood of pixels in the previously reconstructed frame. The result of the thresholding function is summed for all pixels in each macroblock and this sum is compared to selected parameters resulting in the assignment of the macroblock to one of a number of macroblock classes according to the degree of visible changes which have occurred for that macroblock in the current frame. The thresholding function is represented by:

$$T(\hat{F}_{k-1}(N(x)), F_k(x))$$

wherein

N(x) is a neighborhood or area of pixels in a frame containing a subject pixel x;

$F_k(x)$ is the pixel intensity of pixel x of the current frame; and $\hat{F}_{k-1}$ is the pixel intensity of a reconstructed prior frame.

Each frame consists of a plurality of macro blocks B. For the $i^{th}$ macro block $B_i$, the $\delta$ function on every pixel contained within that block is collected and the subject block is assigned to one of the groups of blocks in the frame $F_k$. A value for a summation of the pixel values in a particular block $B_i$ is determined by: $\Delta(B_i) = \Sigma_{x \in B_i} \delta(X)$; based on the relationship of this value to selected parameters, the subject block $B_i$ is assigned to one of an existing group of blocks $\Phi_1, \Phi_2, \Phi_3$, etc. by the following relationship:

$$B_i \in \begin{cases} \Phi_1, & \text{if } \Delta(B_i) \leq n_1 \\ \Phi_2, & \text{if } n_1 < \Delta(B_i) \leq n_2 \\ \Phi_3, & \text{if } \Delta(B_i) > n_2 \end{cases}$$

The values of $n_1$ and $n_2$ are adjustable. $n_1$ can be chosen to be 0 to provide a perceptually distortion-free macro block. However, it has been observed that video generated with a small, non-zero value for $n_1$ is virtually indistinguishable to a viewer from that generated with $n_1=0$, while providing for more efficient coding. The value of boundary $n_2$ provides a tradeoff between picture quality and coding rate.

Based on the parameters $n_1$ and $n_2$ a subject block $B_i$ is assigned to block group $\Phi_1, \Phi_2$ or $\Phi_3$. As the inventive encoder 10 is a layered encoder, the video signal is portioned, as explained above, into a base layer and an error resilience layer. The encoder is designed so that block groups $\Phi_2$ and $\Phi_3$ are encoded by first encoder branch 12 into the base layer, whereas block group $\Phi_1$ is not contained in that layer. On the other hand, the second encoder branch 14 which produces the error resilience layer only encodes block group $\Phi_3$ and skips block groups $\Phi_1$ and $\Phi_2$. Thus, for example, if a current macro block $B_i$ is assigned to block group $\Phi_3$, it is deemed to contain important, high-priority and visually perceptible information and is, therefore, encoded onto both the base layer and the error resilience layer by first and second encoder branches 12, 14, respectively. If the subject macro block $B_i$ is associated with macro block group $\Phi_2$, it is deemed of less importance but still visually perceptible, and is only encoded by first encoder branch 12 onto the base layer. In other words, no enhancement data for the information is required. Finally, if the current macro block $B_i$ is found to be associated with macro block group $\Phi_1$, then the information is deemed to be unimportant and is not coded by either first encoder branch 12 or second encoder branch 14.

The preprocessor 50 may be implemented in any manner well known to those having ordinary shill in the art. For example, a software driven processor may be used to analyze a current frame and compare it to the necessary threshold conditions. In the alternative, discrete components may be utilized for analyzing the current frame and applying the user perception limitation parameters.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A layered encoder for coding an image represented by a video signal defined by a continuous stream of successive-in-time video frames containing macro blocks having a plurality of picture elements and for compensating for errors in transmission of a subject macro block in a current frame by considering human visual perception limitations, said video signal being coded onto a base layer and an error resilience layer of a coded video signal, said encoder comprising:

an input port for receiving the current frame of the video signal, the current frame containing the image of an object;

a perceptual preprocessor connected to said input port and receiving, as input signals, the subject macro block of the current frame and a delayed, quantized version of a prior macro block of a prior adjacent-in-time frame and corresponding to the subject macro block, and generating a determining output signal for comparing, in the event an error in transmission of the subject frame is detected, a difference between picture element intensity values of the object in the subject macro block and picture element intensity values of the object in the prior macro block to predetermined conditions representing limitations in human visual perception;

a motion estimator connected to said input port and to said perceptual preprocessor for estimating, based at least in part on said predetermined conditions, possible motion of the object by comparing a position of the object in the prior macro block to the position of the object in the subject macro block, said motion estimator receiving as input signals said subject macro block, the delayed, quantized version of the prior macro block, and the determining output signal;

a motion compensator for compensating for possible motion of the object from the prior macro block to the subject macro block, said motion compensator receiving as input signals the delayed, quantized version of the prior macro block and a signal from said motion estimator, and outputting a motion compensation signal; and a subtractor for producing an error signal by subtracting picture element intensity values of the picture elements in the prior macro block from picture element intensity values of the picture elements in the subject macro block;

said perceptual preprocessor determining whether said error signal is to be incorporated in one or more of a base layer and an error resilience layer of a coded video signal so that video data contained in the subject macro block for which errors in transmission have been detected will be re-transmitted to a receiver based upon human visual perception limitations considered by said perceptual preprocessor.

2. The layered encoder of claim 1, further comprising a base layer encoder branch connected to said subtractor for producing the base layer of the coded video signal, said base layer encoder branch comprising a transformer for converting the error signal from a spatial domain to a frequency domain, a quantizer for quantizing the converted error signal, and an entropy coder for coding the quantized and converted error signal.

3. The layered encoder of claim 1, further comprising an error resilience layer encoder branch connected to said subtractor for producing the error resilience layer of the coded video signal, said error resilience layer encoder branch comprising a second transformer for converting the error signal from a spatial domain to a frequency domain, a second quantizer for quantizing the converted error signal, and a second entropy coder for coding the quantized and converted error signal.

4. The layered encoder of claim 1, wherein said determining output signal generated by said perceptual preprocessor is derived by (1) comparing an absolute value of the difference between corresponding picture element intensity values to a threshold function, (2) assigning the subject macro block to one of a plurality of macro block groups defining the current frame, and (3) determining whether the error signal is to be incorporated in one or more of the error resilience layer and base layer based on the assignment of the subject macro block.

5. The layered encoder of claim 3, wherein said determining output signal generated by said perceptual preprocessor is derived by (1) comparing an absolute value of the difference between corresponding picture element intensity values to a threshold function, (2) assigning the subject macro block to one of a plurality of macro block groups defining the current frame, and (3) determining whether the error signal is to be directed to one or more of the base layer encoder branch and the error resilience encoder branch.

6. In a layered encoder for coding a video signal defined by a continuous stream of successive-in-time video frames containing an image of an object represented by macro blocks having a plurality of picture elements and for compensating for errors in transmission of a subject macro block in a current frame, the encoder including an input port for receiving the current frame of the video signal containing the image of an object, a motion estimator for estimating frame-to-frame motion of the object, a motion compensator for compensating for motion of the object from the prior macro block to the subject macro block, and a subtractor for producing an error signal by subtracting picture element intensity values of the picture elements in the prior macro block from picture element intensity values of the picture elements in the subject macro block, the improvement comprising:

a perceptual preprocessor for applying human visual perception limitations to compensate for errors in transmission of the subject macro block in the current frame, said preprocessor being connected to the input port and receiving, as input signals, the subject macro block of the current frame and a delayed, quantized version of a prior macro block adjacent-in-time and corresponding to the subject macro block, and generating a determining output signal for comparing, in the event that an error in transmission of the subject frame is detected, the difference between picture element intensity values of the object in the subject macro block and picture element intensity values of the object in the prior macro block to conditions representing limitations in human visual perception, said determining signal being used by the motion estimator and motion compensator in estimating and compensating for motion of the object, and for operatively determining whether said error signal is to be incorporated in one or more of a base layer and an error resilience layer of a coded video signal so that video data contained in the subject macro block for which errors in transmission have been detected will be re-transmitted to a receiver based upon human visual perception limitations considered by said perceptual preprocessor.

7. The improved encoder of claim 6, wherein said determining output signal generated by said perceptual preprocessor is derived by (1) comparing an absolute value of the difference between corresponding picture element intensity values to a threshold function, (2) assigning the subject macro block to one of a plurality of macro block groups defining the current frame, and (3) determining whether the error signal is to be incorporated in one or more of the error resilience layer and base layer based on the assignment of the subject macro block.

8. A method of coding a video signal into a base layer and an enhancement layer and for compensating for errors in transmission of a subject macro block portion of an image on a current frame by considering human visual perception limitations, the image represented by a video signal defined by a continuous stream of successive-in-time video frames containing macro blocks including the subject macro block and having a plurality of picture elements, said method comprising the steps of:

inputting to an input port the current frame of the video signal containing the image of an object;

generating a determining output signal according to conditions representing limitations in human visual perception to determine whether data contained in the current frame should be retransmitted to a receiver;

estimating the motion of the object by comparing a position of the object in a prior macro block adjacent-in-time to the position of the object in the subject macro block by utilizing said output signal from said generating step;

compensating for motion of the object from the prior macro block to the subject macro block by utilizing a delayed, quantized version of the prior macro block and an estimated object motion from said estimating step, and outputting a motion compensation signal; and producing an error signal by subtracting picture element intensity values of the picture elements in the prior macro block from picture element intensity values of the picture elements in the subject macro block;

determining whether said error signal is to be incorporated in one or more of a base layer and an enhancement layer of a coded video signal so that video data contained in the subject macro block for which errors in transmission have been detected will be re-transmitted to a receiver based upon human visual perception limitations considered in said generating step.

9. The method of claim 8, wherein said step of generating a determining output signal comprises the steps of: (1) comparing an absolute value of the difference between corresponding picture element intensity values to a threshold function, (2) assigning the subject macro block to one of a plurality of macro block groups defining the current frame, and (3) determining whether the error signal is to be incorporated in one or more of the error resilience layer and base layer based on the assignment of the subject macro block.

* * * * *